United States Patent

Strenglein

[15] 3,676,865

[45] July 11, 1972

[54] HIGH FREQUENCY SIGNAL MEMORY AND REGENERATOR

[72] Inventor: Harry F. Strenglein, Clearwater, Fla.

[73] Assignee: Sperry Rand Corporation

[22] Filed: Jan. 6, 1971

[21] Appl. No.: 104,370

[52] U.S. Cl. ............................340/173 RC, 328/34, 328/37, 333/29

[51] Int. Cl. ....................................G11c 19/00, G11c 21/00

[58] Field of Search ........................333/29, 30; 340/173 RC; 328/34, 37

[56] References Cited

UNITED STATES PATENTS

| | | | |
|---|---|---|---|
| 2,914,249 | 11/1959 | Goodall | 340/173 |
| 2,987,253 | 6/1961 | Schreiner | 340/173 |
| 3,076,180 | 1/1963 | Havens | 340/173 |

*Primary Examiner*—Terrell W. Fears
*Attorney*—S. C. Yeaton

[57] ABSTRACT

Apparatus for storing high frequency pulse signals affording cycle-by-cycle storage of the carrier wave without degeneration over large periods of time permits undistorted regeneration of the original pulse signal on command.

12 Claims, 1 Drawing Figure

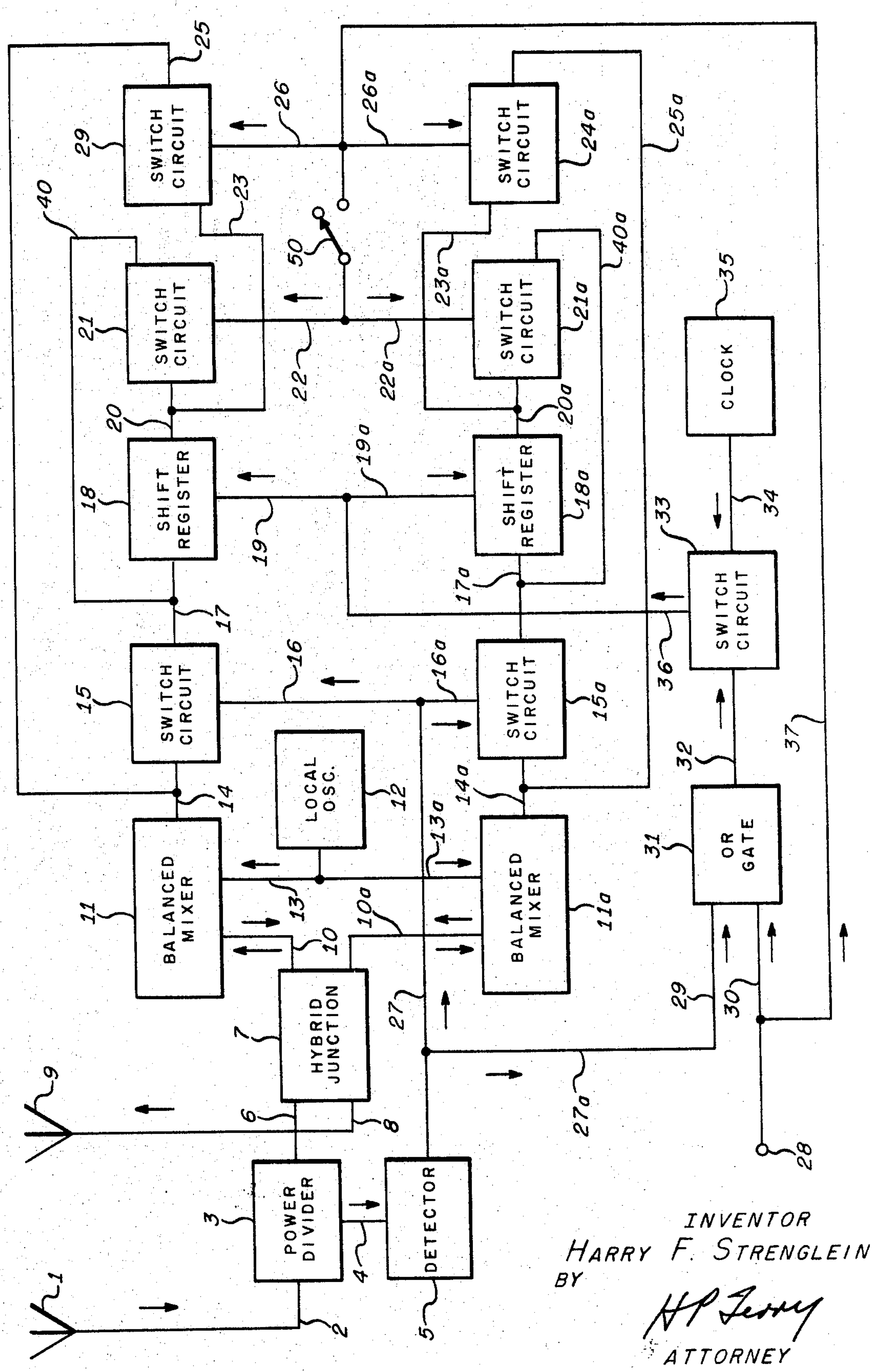
INVENTOR
HARRY F. STRENGLEIN
BY
H P Terry
ATTORNEY

HIGH FREQUENCY SIGNAL MEMORY AND REGENERATOR

BACKGROUND OF THE INVENTION

1. Field of the Invention

The invention pertains to the art of storage of information propagated by electromagnetic carrier wave energy and more particularly concerns storage and regeneration of such information with minimum distortion at an arbitrary time following the storage event.

2. Description of the Prior Art

In several areas of high frequency technology, it has been desired to store phase or frequency information contained in the carrier cycles of relatively short pulses of electromagnetic energy and later to use such stored data for control or other purposes. For example, in high frequency communication and computer systems, it may be desired to reproduce such stored data r: a later time with minimum distortion. Frequency or phase discriminator systems are rarely fast enough to follow carrier variations within received pulses, especially if there are significant data-bearing variations within each pulse envelope. Servo techniques usually employed in such efforts introduce serious errors in tuning magnitudes and rates and involve apparatus of considerable complexity. To a significant degree, data in the received pulses is lost, or is at least seriously distorted. Similar problems prevail when attempts are made to store such data and to regenerate it in its original form for retransmission, for example, in intelligence communication systems and in devices for testing such high frequency communication systems.

SUMMARY OF THE INVENTION

The invention comprises apparatus for the storage and regeneration of information conveyed to a receiving point, for example, by pulses of electromagnetic energy and transmitted in terms of cycle-by-cycle variations of the carrier signal within each pulse envelope. The apparatus permits storage of the carrier phase or frequency data present within a received pulse on a carrier cycle-by-cycle basis without degradation over relatively large periods of time and regeneration with substantially no distortion of the stored data in the form in which it was originally received. The apparatus may take the form of a transponder device, utilizing a high frequency hybrid circuit and balanced mixer system with reciprocal characteristics for modifying the signal to be stored and for reconstituting the stored received signal at a later time. The modified received signal is processed by a digital memory system for storage therein and is fed out upon command in a form suitable for reconstitution by the high frequency circuit.

BRIEF DESCRIPTION OF THE DRAWING

The sole FIGURE is a block diagram showing the arrangement of the electrical components of the invention.

DESCRIPTION OF THE PREFERRED EMBODIMENT

Referring to the sole FIGURE, high frequency or microwave input signals tc be processed are applied to antenna 1 or to other suitable coupling means for connection to the input transmission line 2 of a conventional high frequency power divider 3. Power divider 2 is capable of supplying a main portion os such input energy through an output transmission line 6 and of supplying a predetermined fraction of that energy on a second output transmission line 4 and does not couple out energy flowing in the opposite sense through lines 2 and 6. Transmission line 4 acts as an input to high frequency pulse detector 5, whose function is yet to be described. Transmission line 6 serves as an input coupled to one port of a conventional high frequency quadrature hybrid junction or coupler 7 having additional ports, including ports 8, 10, and 10a. In the present invention, port 8 is the output port of the system, being connected to a reradiating antenna 9, while ports 10 and 10*a* respectively couple to inputs of balanced mixers 11 and 11*a*.

Accordingly, high frequency energy may be passed successively through transmission lines 2, 6, and 10 and 10*a*. It is also to be understood that such high frequency energy may also pass in the opposite sense through transmission line ports 10 and 10*a*, to be supplied by hybrid junction 7 and through transmission line 8 to antenna 9. The operation of the respective balanced mixers 11 and 11*a* is enabled by the presence of the additional respective transmission line ports 13 and 13*a* of the balanced mixers 11 and 11*a*. Transmission lines 13 and 13*a* convey high frequency energy from the conventional local oscillator 12 to the respective balanced mixers 11 and 11*a*. Local oscillator 12 may have a manually or otherwise variable output frequency. It is to be observed that the power divider 3, pulse detector 5, hybrid junction 7, balanced mixers 11 and 11*a*, and local oscillator 12 may be conventional high frequency or microwave devices.

Through the action of local oscillator 12, balanced mixers 11 and 11*a* supply difference frequency signals at their respective output ports 14 and 14*a* to a pair of similar intermediate frequency signal processing channels. For example, the signal processing channel connected to output port 14 includes a conventional high-speed switching circuit 15. Switching circuit 15 is of a conventional type, being caused to provide a conductive path therethrough depending upon the signal placed on control lead 16. The signal output of switching circuit 15, when present, is supplied by connection 17 to a conventional plural stage shift register 18, the operation of shift register 18 being controlled by clock signals made available on clock control lead 19. Any output developed on output lead 20 by shift register 18 may be supplied to a conventional switching circuit 21 having an output lead 40 coupled back to the lead 17 between switching circuit 15 and shift register 18. Switching circuit 21 is operated according to signals applied to it via control lead 22. The output of shift register 18 is, in addition, coupled through leads 20 and 23 to conventional switching circuit 24, whose conductivity depends on signals supplied on control lead 26. Signals passed by switching circuit 24 are coupled by lead 25 back to port lead 14, found between balanced mixer 11 and switching circuit 15. In this circuit, shift register 18 may be, for example, composed of conventional high-speed emitter-coupled flip-flop circuits.

The second processing channel of the invention is coupled to the output port 14*a* of balanced mixer 11*a* and consists of components corresponding to those of the first channel, similarly connected. For example, the intermediate frequency signal processing channel connected to output 14*a* includes the conventional high speed switching circuit 15*a*, again of a conventional type caused to provide a conductive path therethrough depending upon the signal placed on control lead 16*a*. The output of switching circuit 15*a*, when present, is supplied by connection 17*a* to a conventional shift register 18*a*, the operation of shift register 18*a* being controlled by signals made available on clock control lead 19*a*. Any output developed on output lead 20*a* by shift register 18*a* is supplied to a conventional switching circuit 21*a* having an output lead 40*a* coupled back to the lead 17*a* between switching circuit 15*a* and shift register 18*a*. Switching circuit 21*a* is operated according to signals applied to it via control lead 22*a*. The output of shift register 18*a* is, in addition, coupled through leads 20*a* and 23*a* to conventional switching circuit 24*a*, whose conductivity depends on signals supplied by control lead 26*a*. Signals passed by switching circuit 24*a* are coupled by lead 25*a* back to port lead 14*a* between balanced mixer 11*a* and switching circuit 15*a*.

Pulse detector 5 has a dual role involving supply of signals to the two output connections 27 and 27*a*. In particular, pulse detector 5 supplies the detected envelopes of pulse signals collected by antenna 1 via lead 27 to the respective control leads 16 and 16*a* of switching circuits 15 and 15*a*. In addition, the signals derived by pulse detector 5 are supplied by lead 27*a* to one input lead 29 of a conventional OR gate 31. Any output present on the output lead 32 associated with OR gate 31 is applied to make switching circuit 33 conductive. Switching circuit 33 is continuously supplied via input lead 34 with clock signals from clock 35. Thus, clock signals may be passed by the output lead 36 of switching circuit 33 to the control leads 19 and 19a which respectively control shift registers 18 and 18a. Other signals applied to terminal 28 of lead 30 may also actuate OR gate 31, as above.

The command signals applied to terminal 28 are additionally coupled by lead 37 to the control leads 22 and 22a of the respective switching circuits 21 and 21a. These same command signals appearing on lead 37 are additionally coupled to the control leads 26 and 26a, respectively associated with switching circuits 24 and 24a.

While not shown in the sole FIGURE, it is evident that suitable amplifiers may be added in the high frequency and in the intermediate frequency circuits wherever found desirable, For example, high frequency amplification may be provided for the input signals received by antenna 1; bilateral amplifiers or amplifiers in separated receiving and transmitting channels may be employed. Similarly, intermediate frequency amplification may be supplied in the signal processing loops in a conventional manner.

In operation, a high frequency or microwave pulse to be processed is received by antenna 1 and is supplied through power divider 3 to the transmission line port 6 of quadrature hybrid junction or coupler 7. As in conventional operation, the hybrid coupler 7 simply passes substantially equal amplitude versions of the received pulse to ports 10 and 10a. These pulses are emitted from hybrid coupler 7 substantially simultaneously, but the relative phase angles of the envelope carrier signals differ by 90° due to the inherent characteristics of the coupler. When these two pulse signals are mixed in balanced mixers 11 and 11a with the cophasal energy supplied by local oscillator 12, corresponding intermediate frequency pulses are generated respectively at the ports 14 and 14a. These pulses retain certain characteristics of the high frequency pulses appearing on ports 110 and 10a of hybrid coupler 7, in that the phases of the intermediate frequency waves making up the pulses are shifted by 90° with respect to each other. It will be appreciated that the general phase pattern within a given high frequency signal received by antenna 1 is also preserved within the envelopes of the intermediate frequency signals found on port lead 14 and 14a; i.e., if there is a shifting or time varying phase pattern within the envelope of a given received high frequency pulse, it will be duplicated in the intermediate frequency pulses on leads 14 and 14a.

It will be useful to understand at this point in the explanation of the invention that it has certain reciprocal energy transmission properties. For example, if intermediate frequency pulse signals exactly timed and phased like those discussed in the preceding paragraph are present on port leads 14 and 14a, but are flowing respectively into balanced mixers 11 and 11a instead of out of them, these mixers will cooperate with hybrid junction 7 to regenerate an output pulse in transmission line 8 exactly like the originally discussed input high frequency pulse received by antenna 1. Evidently, the regenerated pulse may be re-radiated by antenna 9 or may be used in other known ways. It will be understood that balanced mixers 11, 11a and local oscillator 12 may be omitted if the operating frequency within the processing channels is the same as that of the carrier within transmission line 2.

It is the function of the signal processing circuits coupled to ports 14 and 14a to aid in the regeneration of such signals, the regeneration being commanded at any desired time after a received signal is stored in the two signal processing channels. The signal storage program is self-initiated by the arrival of the high frequency pulse to be stored, since power divider 3 supplies a version of the received signal to pulse detector 5 for that purpose. The detected envelope appearing on lead 27 is caused to hold rapid switching circuits 15 and 15a in their conducting states for the duration of the received pulse. At the end of the latter, switching circuits 15 and 15a rapidly cease conduction. Accordingly, the entire pattern of intermediate frequency cycles on leads 14 and 14a is permitted to flow into the respective multi-stage shift registers 18 and 18a. In a first stage of each of registers 18, 18a, it will be convenient to convert the sine waves into flat topped waves by the use of limiting circuits or other well known means. Both positive and negative excursions of the sine waves are limited.

The operation of the shift registers 18 and 18a is further aided by control or clocking signals appearing on control leads 19 and 19a during the time interval of the received pulse. It is seen that the same detected pulse envelope as is used to control switching circuits 15 and 15a is coupled through OR gate 31 to cause switching circuit 33 to conduct clock or timing signals from clock 35 to the clock control leads 19 and 19a of shift registers 18 and 18a. The shift registers 18 and 18a are supplied with 90° shifted intermediate frequency signals to be processed. Each shift register detects the amplitude of its intermediate frequency signal at a sampling rate equal to the clock frequency. The shift registers 18 and 18a act in a conventional manner to hold the sampled value for a period of time equal to the clock pulse interval, after which time a new sample is then taken.

If the intermediate frequency waves have been converted to symmetric flat topped waves, the inputs to be sampled will have amplitudes corresponding to logic levels one or zero. To recognize these values and to store the phase quadrature characteristics of the waves, it is necessary that at least one sample be taken during each combination of logic states characterizing the two intermediate frequency waves. Thus, a minimum of at least four samples per cycle of the intermediate frequency signal is desired. The ratio of four to one is intended to be illustrative of one way of operating the system; other ratios including non-integral ratios may readily be employed. A further requisite characteristic of shift registers 18 and 18a in most modes of operation is that all of the intermediate frequency cycles of a pulse to be stored fit with each within each register.

It is seen that the intermediate frequency waves are fed into shift registers 18 and 18a at the relatively high clock frequency and that the information thus stored in the registers comprises respective pulse length varying waves approximating the original intermediate frequency sine waves and therefore also approximating the original high frequency carrier wave. The approximation is modified to a tolerable degree, since the zero axis crossing times of the original waves are actually synchronized with the clock pulses. If the rate of clock 35 is four times that of the frequency of the signal input to the registers, the basic information as to input signal frequency and the 90° phase differential between the two intermediate frequency signals is preserved. This stored data may be stored indefinitely in shift registers 18 and 18a by stopping the effect of clock 35, which is automatically done by switching circuit 33 when there is no signal present on lead 32.

If clock 35 should be started after data has been stored in the signal processing channel, the stored information reappears at the output leads 20 and 20a of the respective registers 18, 18a. For this purpose, clock 35 is actuated by supply of a command signal on terminal 28 which is then coupled by lead 30 to OR gate 31 and thence by lead 32 to switching circuit 33. The latter switching circuit is again made conductive causing clock pulses on lead 34 to flow via lead 36 to operate shift registers 18, 18a. The same command signal flows through lead 37 to the respective control leads 22, 22a and 26, 26a of fast switching circuits 21, 21a and 24, 24a.

The command signal on terminal 28 thus causes switching circuits 21, 21a, 24, 24a to transfer to their conductive states. Conduction of switching circuit 21 permits the shift register 18 to recycle the stored data from the output to the input of shift register 18. Conduction of switching circuit 21a, again with the manual switch 50 in its conducting condition, permits the shift register 18a continuously to recycle the stored data from the output to the input of register 18a as long as the command signal is applied to terminal 28. With switch 50 conductively closed, the reconstituted, 90° shifted intermediate frequency pulses appear at balanced mixer ports 14 and 14a at a steady repetition rate.

Such operation depends also upon the fact that switching circuits 24 and 24*a* have been made conductive by the command signal. As the data is recirculated, for example, through shift register 18, it is also coupled through the conducting switching circuit 24 via lead 23 and flows along lead 25 to port 14 of the balanced mixer 11. With a manual switch 50 open as illustrated in the drawing, shift register 18 does not recirculate the data, but the latter is simply passed once via lead 25 to port 14. As data is recirculated through shift register 18*a*, it is also coupled through the conducting switching circuit 24*a* via lead 23*a* and flows along lead 25*a* to port 14*a* of balanced mixer 11*a*. With manual switch 50 open as illustrated in the figure, shift register 18*a* does not recirculate the data. Instead, the stored data is read out only once via lead 25*a* to port 14*a*.

It is thus seen that the outputs of shift registers 18 and 18*a* may conveniently be fed back to their own respective inputs, so that the stored information is recirculated and not lost. If the shift registers 18,18*a* have capabilities for storing pulses about equal in length to the input pulse, the stored portion of the input pulse can be recycled or recirculated indefinitely, producing an essentially continuous wave output signal. If shift registers 18, 18*a* have storage capabilities longer than the input pulse, the original pulse is substantially duplicated.

As noted previously, the reconstituted intermediate frequency pulse appearing at the respective ports 14, 14*a* of balanced mixers 11, 11*a*, because of the reciprocity characteristics of the high frequency circuits of the system, are reconstructed as high frequency pulses for radiation from antenna 9. The reconstructed intermediate frequency pulses appearing at ports 14, 14*a* flow into balanced mixers 11 and 11*a*, and these mixers cooperate with local oscillator 12 and hybrid junction 7 to regenerate output pulses at antenna 9 substantially exactly like the originally received high frequency pulse. Any frequency or phase shift with time occuring within the original high frequency pulse is stored and is substantially exactly reproduced when the high frequency pulse is reproduced. The delay between reception and transmission can be very long, as the stored data is not stored in capacitors or other storage devices in which it may degenerate with passage of time. Since no servomechanism loops are used, incoming signals with a wide variety of pulse repetition frequencies can be accommodated without difficulty and may be regenerated with substantially no distortion.

The versatility of the invention may be further illustrated by calling attention to a modification of the apparatus of the sole figure. If it is desired that antenna 1 serve both as a receiving and transmitting antenna, lead 25 may connect the output of switch circuit 24 to lead 14*a*, instead of to lead 14. Likewise, lead 25*a* is used to connect to the output of switch circuit 24*a* to lead 14, instead of to lead 14*a*. In this modification, port 8 of hybrid junction 7 is supplied with a non-reflecting termination and port 6 is used as an input-output port.

While the invention has been described in its preferred embodiment, it is to be understood that the words which have been used are words of description rather than of limitation and that changes within the purview of the appended claims may be made without departure from the true scope and spirit of the invention in its broader aspects.

I claim:

1. Apparatus for processing an original pulsed carrier wave comprising:
- means having plural port means for converting said original pulsed carrier wave to first and second carrier waves appearing at respective first and second of said plural port means,
- said first and second carrier waves having quadrature phase relation one with respect to the other, and
- first and second signal processing means respectively coupled to said first and second port means for receiving said respective first and second carrier waves,
- said signal processing means each comprising in series connected relation;
  - first switching means adapted to be conducting only for the duration of said original pulsed carrier wave signal, and
  - shift register means adapted to accept signals for storage conducted thereinto by said first switching means.

2. Apparatus as described in claim 1 wherein said means for converting comprises hybrid network energy propagation means.

3. Apparatus as described in claim 2 comprising:
- first and second balanced mixer means each having first and second port means,
- said first and second port means of said hybrid network means being respectively connected in energy exchanging relation with said first port means of said balanced mixer means.

4. Apparatus as described in claim 3 comprising:
- local oscillator means,
- said local oscillator means being connected in energy exchanging relation with said second port means of said balanced mixer means.

5. Apparatus as described in claim 1 comprising:
- means for detecting the envelope of said original pulsed carrier wave, and
- means coupled to said detecting means for controlling the conductivity of said first switching means in said respective first and second signal processing means.

6. Apparatus as described in claim 5 comprising clock means for supplying synchronizing clock signals to said shift register means in said respective first and second signal processing means.

7. Apparatus as described in claim 6 comprising switching means connected in series relation with said clock means for controlling the supply of said clock signals.

8. Apparatus as described in claim 7 comprising means coupled to said detecting means for controlling the conductivity of said switching means connected in series relation with said clock means.

9. Apparatus as described in claim 1 comprising:
- second switching means in said first and second signal processing means providing, when conducting, a feed back path across said shift register means for the purpose of recirculating signals stored in said shift register means, and
- first command signal means for causing said switching means to conduct.

10. Apparatus as described in claim 1 comprising:
- third switching means in said first and second signal processing means, providing, when conducting, respective direct connection between said shift register means and said respective first and second port means of said converter means, and
- second command signal means for causing said third switching means to conduct for the purpose of permitting said converter means to reconstitute said original pulsed carrier wave.

11. Apparatus as described in claim 9 comprising means for causing said shift register means to shift stored signals when said second switching means is in the conductive state.

12. Apparatus as described in claim 10 comprising means for causing said shift register means to shift stored signals when said third switching means is in the conductive state.

* * * * *